United States Patent [19]
Kirby et al.

[11] Patent Number: 5,630,699
[45] Date of Patent: May 20, 1997

[54] PUMP BOX WITH REPLACEABLE EROSION PROTECTOR

[75] Inventors: Michael P. Kirby, Illawong; Sarath Rujakaruna, Parramatta; Jorge Mellado, Fairfield, all of Australia

[73] Assignee: Durametallic Corporation, Kalamazoo, Mich.

[21] Appl. No.: 521,637

[22] Filed: Aug. 31, 1995

[51] Int. Cl.⁶ .................................................. F04D 29/12
[52] U.S. Cl. ........................ 415/111; 415/230; 415/231; 277/65; 277/134
[58] Field of Search .............................. 415/111, 230, 415/231; 277/134, 65

[56] References Cited

U.S. PATENT DOCUMENTS

| | | | |
|---|---|---|---|
| 2,109,679 | 3/1938 | Neveling | 415/111 X |
| 4,496,281 | 1/1985 | Noack | 415/111 |
| 4,848,774 | 7/1989 | Nyilas et al. | 415/111 X |
| 5,238,253 | 8/1993 | Sieghantner | 415/231 X |
| 5,499,901 | 3/1996 | Rockwood | 277/134 X |
| 5,503,407 | 4/1996 | McNickle | 277/134 |
| 5,553,868 | 9/1996 | Dunford | 277/134 X |
| 5,553,870 | 9/1996 | Czekansky et al. | 277/134 |

*Primary Examiner*—Richard E. Gluck
*Attorney, Agent, or Firm*—Flynn, Thiel, Boutell & Tanis, P.C.

[57] ABSTRACT

A mechanical seal is disposed in surrounding relationship to a pump shaft within an enlarged-bore seal chamber defined by the pump housing to create a sealed relationship therebetween. The mechanical seal includes a gland ring stationarily fixed to the pump housing for closing off an outer end of the enlarged-bore seal chamber. An annular erosion protector is disposed within the enlarged-bore chamber in close and generally overlapping relationship to the inner axial face of the gland ring. This annular protector has radially projecting protrusions which project axially inwardly along the outer portion of the enlarged-bore chamber, and also preferably has an annular part which projects radially inwardly so as to effectively cover substantially the entire inner face of the gland ring. The erosion protector is effective in significantly eliminating direct erosion-contact of pump fluid against both the gland ring and the surrounding wall of the seal chamber.

19 Claims, 5 Drawing Sheets

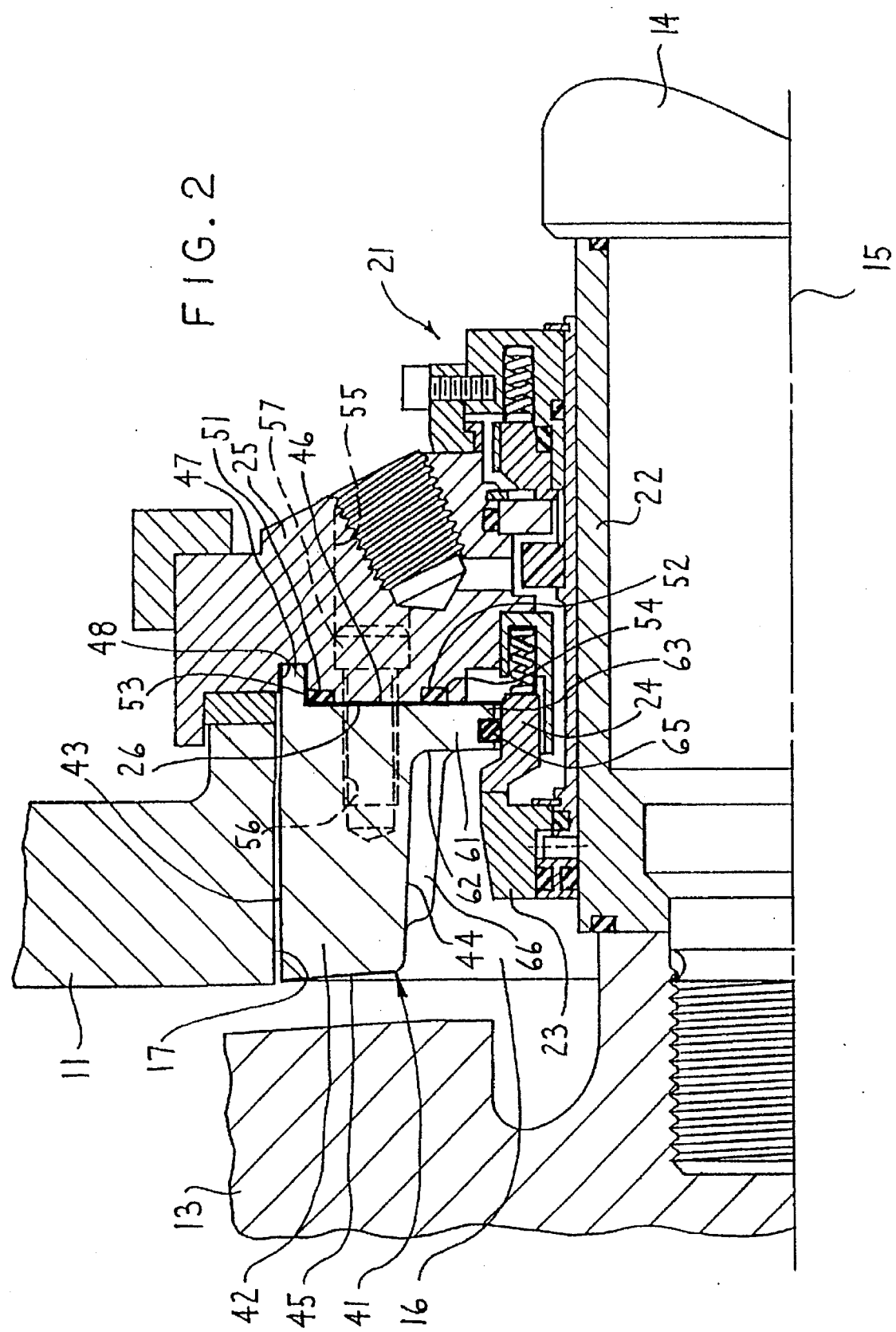

5,630,699

PUMP BOX WITH REPLACEABLE EROSION PROTECTOR

FIELD OF THE INVENTION

This invention relates to a pump of the type typically used for handling abrasive liquids and having an enlarged-bore seal chamber or box in which a mechanical seal assembly is disposed, and more particularly to an improved erosion protector which mounts in the enlarged-bore seal chamber in surrounding relationship to the mechanical seal assembly to significantly minimize erosion of the chamber walls.

BACKGROUND OF THE INVENTION

Pumps utilized for pumping abrasive fluids, specifically slurries, are conventionally provided with an enlarged-bore seal chamber through which a rotatable pump shaft projects, and a mechanical seal assembly is traditionally mounted in this chamber for creating a sealed relationship between the shaft and the surrounding housing. It has long been observed, however, that this arrangement causes undesirably rapid wear particularly of the seal assembly and specifically the gland ring which fixes to the housing when the fluid being handled is abrasive, such as a slurry. The operation of the pump causes some of the pumped fluid to circulate within the enlarged-bore seal chamber in surrounding relationship to the mechanical seal, and this circulation causes the fluid to move both circumferentially and axially in the chamber. The abrasive fluid thus undergoes a flow reversal adjacent the gland which, coupled with rotational centrifugal effects on heavier particles which tend to collect in the outer corner of the chamber, effect erosion and hence wear of the gland ring at an undesirably rapid rate. This thus necessitates repair and maintenance of the seal assembly at a more frequent than desired interval.

In an effort to minimize such erosion-induced wear, some pumps have recently been provided with axially-extending protrusions fixed to or adjacent the outer wall of the enlarged-bore seal chamber, with these protrusions projecting axially inwardly from adjacent the gland of the seal assembly. These protrusions have been observed to at least provide some improvement in the fluid circulation pattern with respect to minimizing at least erosion-induced wear on the pump housing itself, but it has been observed that most of the proposals and structures have so far failed to significantly minimize or eliminate erosion-induced wear of the gland ring.

Typical known proposals or structures involving protrusions or flow modifiers within the enlarged-bore seal chamber are illustrated by FIG. 1, and are explained in greater detail hereinafter.

Attention is also directed to the paper entitled "Enhanced Mechanical Seal Performance Through Proper Selection and Application of Enlarged-Bore Seal Chamber", Proceedings of 10th International Pump Users Symposium, 1993, wherein this erosion problem and the proposed use of protrusions as flow modifiers are described in detail.

It is an object of this invention to provide an improved erosion protector or flow modifier for disposition within an enlarged-bore seal chamber in surrounding relationship to the mechanical seal so as to greatly minimize erosion-induced wear of the gland ring when the pump is handling abrasive fluids such as slurries. The improvement of this invention is believed to provide a significantly greater reduction in erosion-induced wear, such as when handling abrasive fluids, than was possible with prior structures and proposals.

According to the present invention, a mechanical seal is disposed in surrounding relationship to a pump shaft within an enlarged-bore seal chamber defined by the pump housing to create a sealed relationship therebetween. The mechanical seal assembly includes a gland ring which is stationarily fixed to the pump housing for closing off the outer end of the enlarged-bore seal chamber. An annular erosion protector or flow modifier according to the invention is disposed within the enlarged-bore chamber in close and generally overlapping relationship to the inner axial face of the gland ring, with this annular protector having axially projecting protrusions which project axially inwardly along the outer portion of the enlarged-bore chamber. The protector preferably occupies a significant part of the volume of the enlarged-bore chamber to minimize the quantity of pump fluid entering therein, and is effective in significantly eliminating direct erosion-contact of the pump fluid against both the gland ring and the surrounding wall of the seal chamber. The annular protector is preferably stationarily but removably attached to the gland ring so as to permit it to be readily removed and replaced when worn, whereby shutdown and repair of the seal can be accomplished quickly and economically.

In the improved arrangement of the present invention, as aforesaid, the annular erosion protector preferably includes an annular wall part provided at the axially outer end thereof and projecting radially inwardly so as to effectively cover the gland ring, with this latter annular wall part having an inner annular edge which in a preferred embodiment is substantially maintained in sealing engagement with the non-rotatable face ring of the seal assembly.

In the improved arrangement, as aforesaid, the protector ring may in one embodiment be constructed integrally of one-piece or alternatively the protector may have separate annular parts, one defining the projections thereon and the other projecting radially inwardly for covering the gland face, with these two annular parts being constructed of different materials if desired.

In the improved arrangement of the present invention, as aforesaid, the annular protector can be formed of a suitable material, either a hard or a soft material, depending upon the nature of the abrasive fluid being handled.

Other objects and purposes of the invention will be apparent to persons familiar with structures of this general type upon reading the following specification and inspecting the accompanying drawings.

BRIEF DESCRIPTION OF THE DRAWINGS

FIG. 2 is an enlarged fragmentary view showing only the upper half of the seal chamber containing a mechanical seal therein, and particularly showing a first embodiment of the improved annular protector of this invention disposed within the enlarged-bore seal chamber.

Figure 1:
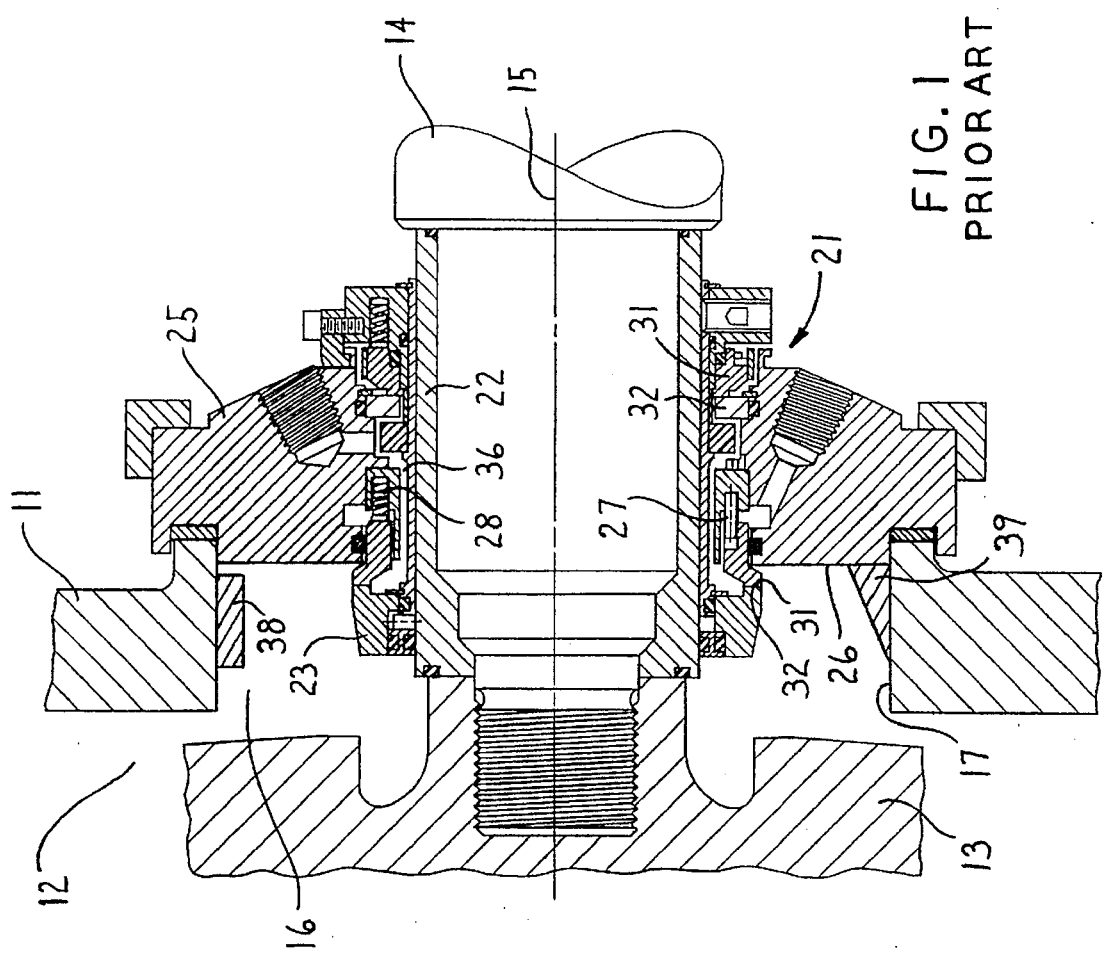
FIG. 1 is a fragmentary cross-sectional view which illustrates part of a conventional pump having an enlarged-bore seal chamber containing a mechanical seal therein, and illustrating prior projection structures proposed for use in the seal chamber.
Figure 5:
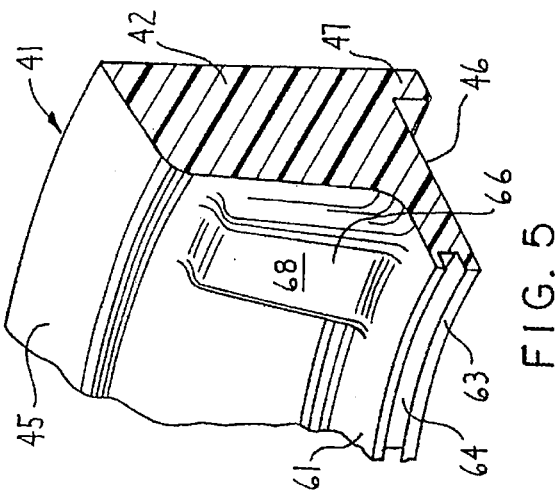
FIG. 5 is a fragmentary perspective view showing a part of the annular protector of FIG. 2 and specifically one of the projections as formed on the inner wall thereof.
Figure 4:
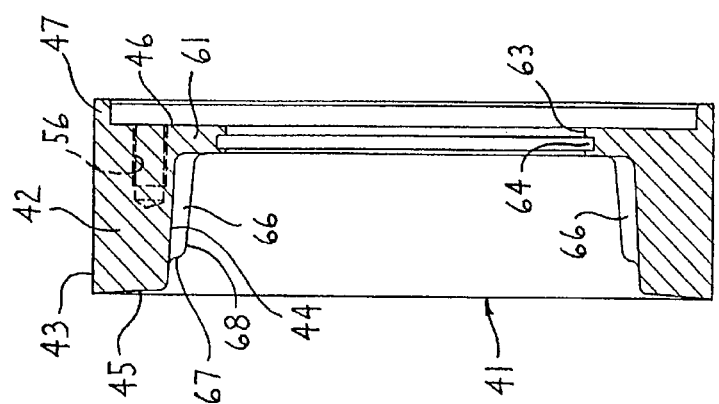
FIG. 4 is a sectional view taken generally along line 4—4 in FIG. 3.
Figure 3:
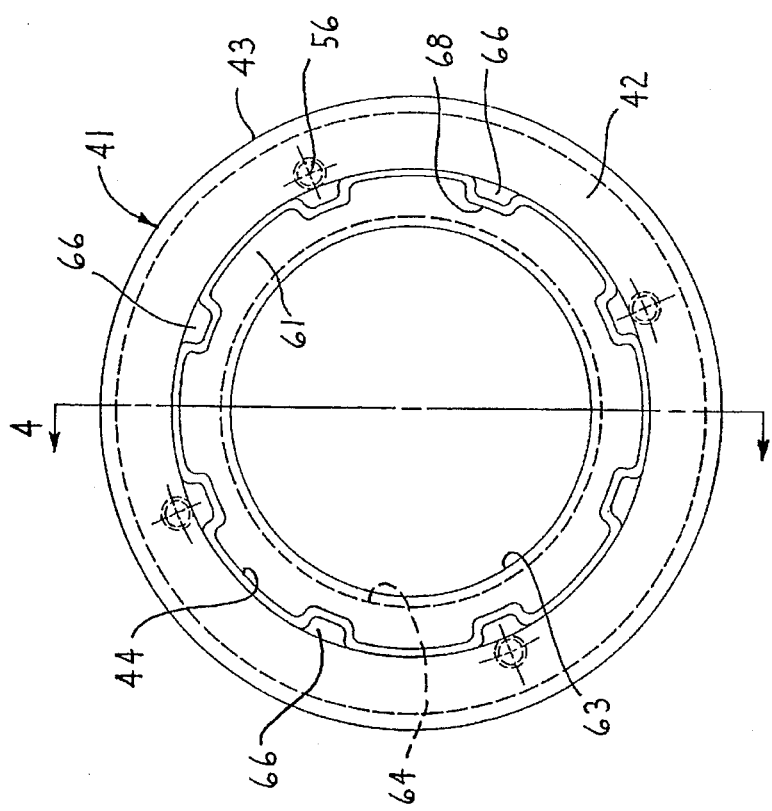
FIG. 3 is an end elevational view of the annular protector of FIG. 2 as disassembled from both the seal chamber and the mechanical seal.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the apparatus and designated parts thereof. In addition, the word "inner" will be used to refer to the axial end of the seal chamber which is closest to the pumping chamber, this being the leftward end in FIG. 2, and the word "outer" will refer to the opposite end of the seal chamber which communicates with the surrounding environment, this being the rightward end in FIG. 2. Said terminology will include the words specifically mentioned, derivatives thereof, and words of similar import.

DETAILED DESCRIPTION

Referring to FIG. 1, there is illustrated a conventional arrangement wherein a pump employs a mechanical seal within an enlarged-bore seal chamber. More specifically, the pump includes a pump housing 11 which defines therein a pump chamber 12, with a rotatable pumping element such as an impeller 13 being disposed therein and secured to one end of a shaft 14 which is rotatable about its longitudinally extending axis 15. The shaft projects substantially coaxially outwardly through an enlarged-bore seal chamber 16, the latter being defined generally within a cylindrical peripheral wall 17 as defined on the pump housing.

A mechanical seal arrangement 21 is provided for creating a sealed relationship between the pump housing and the shaft, the latter in the illustrated embodiment being provided with a shaft sleeve 22 nonrotatably secured in surrounding relationship thereto, such being conventional. The mechanical seal arrangement 21 includes a rotating seal ring 23 which surrounds and is nonrotatably secured to the shaft sleeve 22, and it cooperates with a nonrotatable (i.e., commonly referred to as a stationary) seal ring 24, the latter being nonrotatably and sealingly supported on a gland ring 25 which concentrically surrounds the shaft and projects radially outwardly for securement to the pump housing by means of suitable fasteners (not shown) such as screws. The gland ring 25 has an inner annular end face 26 which projects radially of the seal ring 24 and effectively closes off the outer end of the seal chamber 16. The nonrotating seal ring 24 is axially movably supported on the gland 25, and for this purpose the seal ring 24 and gland 25 are joined by axially extending pins 27 which permit the seal ring 24 to move axially, and suitable springs 28 axially bias the nonrotating seal ring 24 toward and into engagement with the rotating seal ring 23. These seal rings 23 and 24 respectively have flat annular axially-facing seal faces 31 and 32 respectively formed thereon and normally maintained in opposed but relatively rotatable abutting engagement with one another to create a seal, such arrangement being conventional and well known.

The mechanical seal arrangement 21 includes not only an inboard seal as defined by the opposed seal rings 23 and 24 described above, but also includes an outboard seal defined by opposed and relatively rotatable sealing rings 34 and 35, the ring 34 being nonrotatably but axially movable mounted on the shaft and being urged axially into engagement with the opposed ring 35 which is stationarily supported on the gland 25. The inboard and outboard seals in turn are in communication with an intermediate chamber 36 to which a barrier or cooling fluid is conventional supplied. The illustrated seal arrangement 21 is thus a double seal in that it includes inboard and outboard seals, although it will be appreciated that the invention as described hereinafter is equally applicable to a single seal.

The arrangement of FIG. 1 also illustrates in the upper half thereof the provision of protrusions 38 fixed to the annular boundary wall 17 defining the seal chamber 16. The protrusions 38 are fixed to and project radially inwardly from the peripheral wall 17, and are axially elongated so as to project axially inwardly a significant distance along the seal chamber, with the axially outer ends of these protrusions 38 typically being disposed in the vicinity adjacent the outer corner of the seal chamber defined between the wall 17 and the gland face 26. The protrusions 38 are typically fixedly and permanently secured to the pump housing, and a plurality of such protrusions are disposed in spaced relation circumferentially around the seal chamber.

As an alternative to the protrusions 38, and as illustrated by the bottom half of FIG. 1, it has also been proposed to provide the seal chamber with protrusions having a configuration similar to the protrusions 39. Such protrusions again are positioned adjacent the axially outer corner of the seal chamber substantially at the intersection between the gland face 26 and the outer seal chamber wall 17. The protrusions 39 have a significant taper in that they basically taper to a point as they project axially inwardly, and protrusions 39 according to this proposal have a generally triangular cross section.

The prior arrangement of FIG. 1 as described above, whether provided with the protrusions 38 or the protrusions 39, is intended to minimize the erosion-induced wear which typically occurs in the seal chamber 16 or on the gland 25 due to handling of abrasive fluids, particularly fluids having larger abrasive particles, and specifically the wear which has been commonly observed to occur on both the outer chamber wall 17 and the inner gland wall 26 particularly in the vicinity of the outer corner. While the protrusions 38 and 39 are believed to be somewhat effective in minimizing wear in the direct vicinity of the outer corner by directing the heavy particles radially inwardly away from the corner, nevertheless it has been observed that undesirable erosion-caused wear continues to be a significant problem, particularly on the gland face 26.

Accordingly, to significantly improve the overall operation and durability, and specifically to greatly minimize erosion-induced wear on both the seal chamber wall 17 and the gland face 26 due to the pumping of abrasive fluids, a first embodiment of the present invention as illustrated in FIG. 2 provides an annular erosion protector 41 which attaches to the gland 25 and projects axially inwardly into and substantially occupies a significant and preferably a majority of the volume of the annular seal chamber 16.

The erosion protector 41, as illustrated by FIGS. 2–5, is preferably formed as a one-piece annulus or ring having a main annular body 42 which is generally of an axially elongated and substantially rectangular cross section defined by generally axially elongated outer and inner cylindrical walls 43 and 44, respectively, which walls are joined at their inner ends by an inner end wall 45, whereby the main body 42 hence projects axially into the seal chamber 16 over substantially the entire axial length thereof as defined by the peripheral wall 17.

The protector ring 41 has a rear axially end face or wall 46 which is generally flat and is adapted to substantially abut and oppose the inner gland face 26. The ring 41 also has an annular guide flange or rim 47 which projects axially outwardly from the outer end face 46, which flange 47 in the illustrated embodiment having its outer peripheral wall substantially continuous with the outer wall 43. This annular guide flange 47 projects axially into and is snugly accommodated within an annular guide groove 48 which is formed axially inwardly from the inner gland face 26 in concentric relationship to the gland ring.

The inner gland face 26 also has a pair of concentric annular grooves 51 and 52 formed axially inwardly thereof, and these grooves 51 and 52 each respectively accommodate therein an elastomeric seal ring 53 and 54, such as an O-ring, these seal rings being maintained in sealing engagement with the outer end face 46 of the erosion protector ring 41.

The protector ring 41 is fixedly but detachably secured directly to and carried by the gland ring 25. For this purpose the gland ring 25 has a plurality of bores 55 opening axially therethrough in circumferentially spaced relation therearound, and these bores 55 in turn align with blind threaded bores 56 which open axially inwardly through the outer end face 46 into the main annular body 42. The aligned bores 55 and 56 in turn accommodate therein threaded fasteners such as screws 57 so as to fixedly but detachably mount the protector ring 41 directly to the gland ring 25. When so mounted, the protector ring 41 thus projects axially into and occupies a majority of the volume of the seal chamber 16 substantially as illustrated by FIG. 2, and the outer wall 43 of the protector ring is positioned in close and concentric relationship to the peripheral wall 17 so as to effectively protect it from contact by the pump fluid which enters the seal chamber.

The protector ring 41 also has an annular flange part 61 which, in this embodiment, is integral with the main body 42 at the axially outer end thereof and projects radially inwardly therefrom. This annular flange part 61 has an axial outer end wall which is contiguous with and in fact defines the end wall 46, and also has a inner or front end wall or face 62 which is spaced axially inwardly a small distance from the end face 46. The flange part 61 has an axial thickness which is of small axial extent in comparison to the axial extent of the annular body 42.

The annular flange part 61 is disposed so as to generally concentrically surround the nonrotatable seal ring 24, and the flange part 61 defines therein a central opening 63 which closely accommodates therein the nonrotating seal ring 24. This opening 63, in the generally cylindrical peripheral wall thereof, is provided with a surrounding annular groove 64 which accommodates therein an annular elastomeric seal ring 65, such as an O-ring, the latter being maintained in sealing engagement with the exterior cylindrical periphery of the nonrotating seal ring 24. The seal ring 65, however, permits any required movement of the nonrotating seal ring 24, such as axial movement thereof due to the urging of the springs 28.

The protector ring 41 also has a plurality of protrusions 68 formed on the annular main body 42 and projecting radially inwardly from the inner peripheral wall 44 thereof. A plurality of such protrusions 66 are provided in generally uniformly angularly spaced relation around the protector ring, and each protrusions 66 has an axially outer end thereof which effectively merges into the front wall 62 of the annular flange part 61. The protrusions 66 are elongated axially inwardly from the flange part 61 and project axially so as to extend over a majority of the axial extent of the main annular body 42, with the individual protrusions terminating at an axially inner free end 67 which is preferably disposed adjacent but spaced axially outwardly a small distance from the inner end wall 45.

Each of the protrusions 66, in the illustrated and preferred embodiment, has a radially inwardly projecting bottom wall 68 which is preferably of a slight taper or slope, typically and preferably a slope of about 3° to about 5°, which slope converges generally toward the axis 15 as the projection extends axially toward the annular flange part 61. This slight taper or convergence of the protrusions as they extend toward the outer end of the seal chamber is believed to improve the circulation of pump fluid within the chamber and the redirection of the fluid including the abrasive particles therein back to the pump chamber.

With the improved arrangement of this invention as briefly described above and as illustrated by FIGS. 2–5, the protector ring 41 itself preferably occupies at least a majority of the otherwise open annular volume of the seal chamber 16, thereby greatly reducing the quantity of pumping fluid which can access the seal chamber 16, and this in itself is effective for minimizing erosion. Further, the fact that the ring 41 extends axially throughout substantially the full length of the seal chamber and the fact that the annular body portion 42 is of significant size and results in the projections 66 being positioned radially inwardly a substantial distance from the peripheral wall 17 also minimizes the velocity-induced erosion effects of the abrasive fluid. And, inasmuch as the annular flange part 61 projects radially inwardly so that the end face 46 effectively totally covers the inner gland face 26, and since the annular flange part 61 is also preferably sealingly engaged with the nonrotating seal ring 24, this effectively isolates the inner gland face 26 from the abrasive pump fluid within the seal chamber 16. With this arrangement, the peripheral housing wall 17 and the inner gland face 26 of the seal chamber 16 are thus substantially protected in their entirety, and are particularly protected in the vicinity of the outer corner where heavy abrasive particles would otherwise tend to accumulate. This protector 41 thus is highly effective in substantially eliminating erosion-induced wear of these surfaces by the abrasive pumping fluid. Rather, if any erosion-induced wear occurs, such wear will occur primarily on the protector ring 41 itself, and when such wear occurs, such ring 41 can be easily and efficiently replaced merely by removing the gland ring 25, removing the worn protector ring 41 and replacing it with a new one, and reattaching the gland ring 25 to the pump housing. The overall maintenance operation and shut down time is thus greatly minimized. Further, replacement of the erosion protector ring 41 is significantly less costly than replacing and/or repairing either the gland ring 25 or the pump housing 11.

In addition, the erosion protector ring 41 itself can be manufactured of a wide variety of different materials, with the particular material being selected so as to provide the most suitable properties for use in conjunction with the fluid being handled by the pump. In some instances, the protector ring 41 may be molded in one piece of a plastics material, or alternatively may be a metal base member having a plastic coating or layer thereover. This enables use of either soft or hard plastic materials, depending upon which material is most suitable for use with the particular pump fluid being handled. In other instances it may be desirable to provide the protector ring with a suitable anti-abrasive coating since such may itself greatly minimize wear of the protector ring. Such coating can obviously be more easily and inexpensively provided on the separate protector ring, rather than on the pump housing or gland face surfaces.

Figure 6:
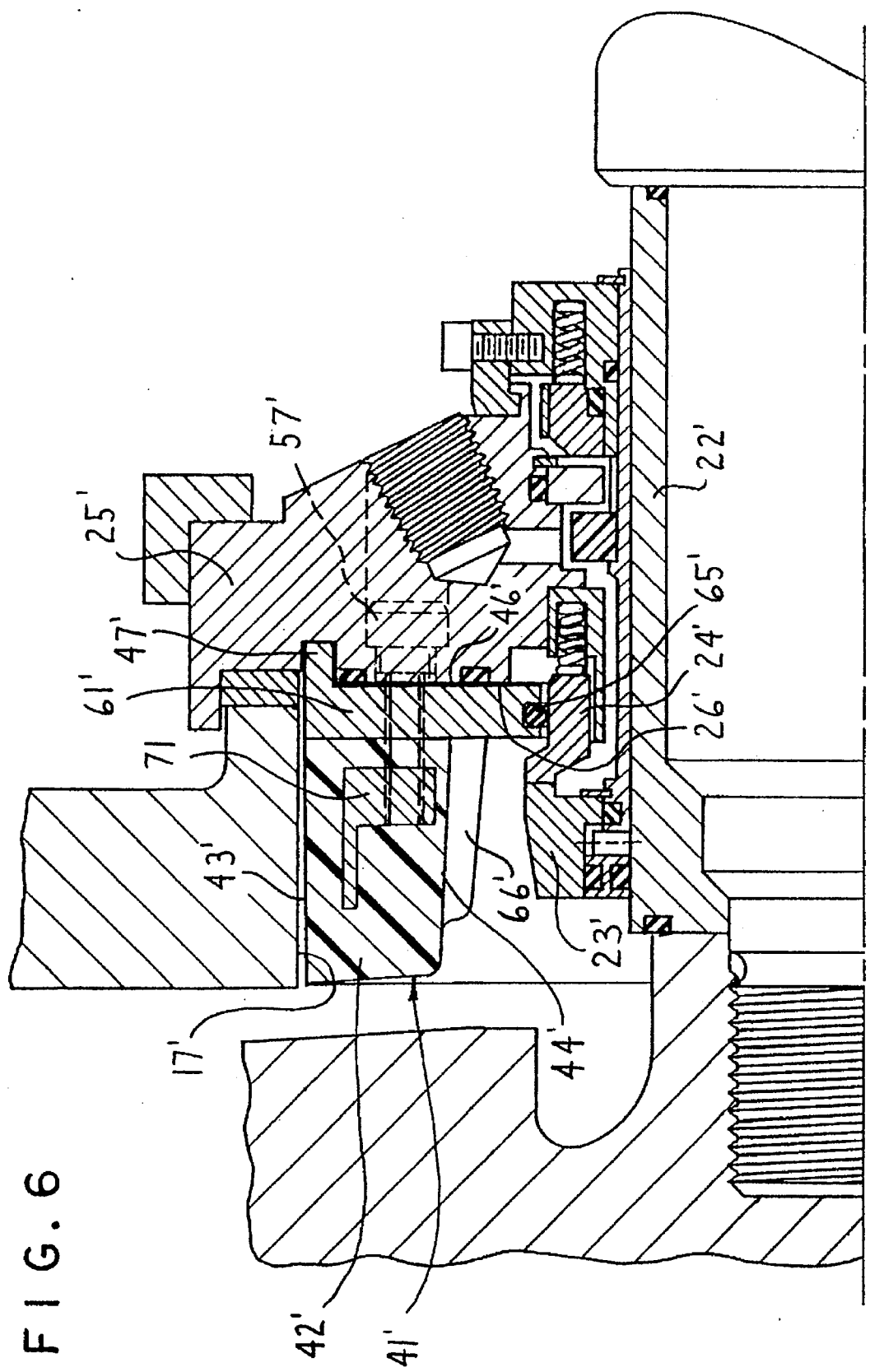
FIG. 6 is an enlarged fragmentary view similar to FIG. 2 but showing a second embodiment of an improved annular protector of this invention as disposed within the enlarged-bore seal chamber.

Referring now to FIG. 6, there is illustrated a second embodiment of the invention which is similar to the embodiment of FIG. 2, and hence corresponding parts thereof are designated by the same reference numerals utilized above but with addition of a prime (') thereto.

More specifically, the annular erosion protector ring 41' of FIG. 6 possesses all of the same structural and functional relationships of FIG. 2 except that the outer annular body 42' and the radially inwardly protecting annular part 61' are initially formed as separate members. These two members are then disposed in generally axially aligned relationship and are axially secured together and to the gland plate 25' by means of the threaded fasteners 57'. In FIG. 6, however, the construction of the annular parts 42' and 61' as separate members enables them to be constructed of different materials, if desired, so as to improve not only the manufacture of the annular protector ring, but also to improve the properties thereof when in use within the seal chamber. In the embodiment illustrated by FIG. 6, the annular body 42' is illustrated as formed of an elastomeric material, such as a rather stiff plastic material such as urethane, the latter being molded around an insert ring 71. At the same time, the annular radial member 61' can be of a wholly dissimilar material, such as a metal or other dissimilar material in the illustrated embodiment. The threaded fasteners 57' then extend through the bores formed in the gland plate 25' and into aligned bores which are formed axially of the radial plate part 61' and the annular body 42', with the threaded fasteners being engaged with the insert 71 so as to enable the members 42' and 61' and hence the entire body of the ring 41' to be axially but removably fixed to and carried by the gland ring 25'.

By making the erosion protector ring 41' of FIG. 6 of two separate pieces or members, namely the body 42' and the annular part 61', this hence permits each of the members to be selectively constructed of a material which will optimize the wear properties. Further, when wear of either the member 42' or 61' occurs, each member can be easily and individually replaced, while at the same time the construction of the basic seal, such as the housing or the gland, is maintained without excessive wear.

Figure 7:
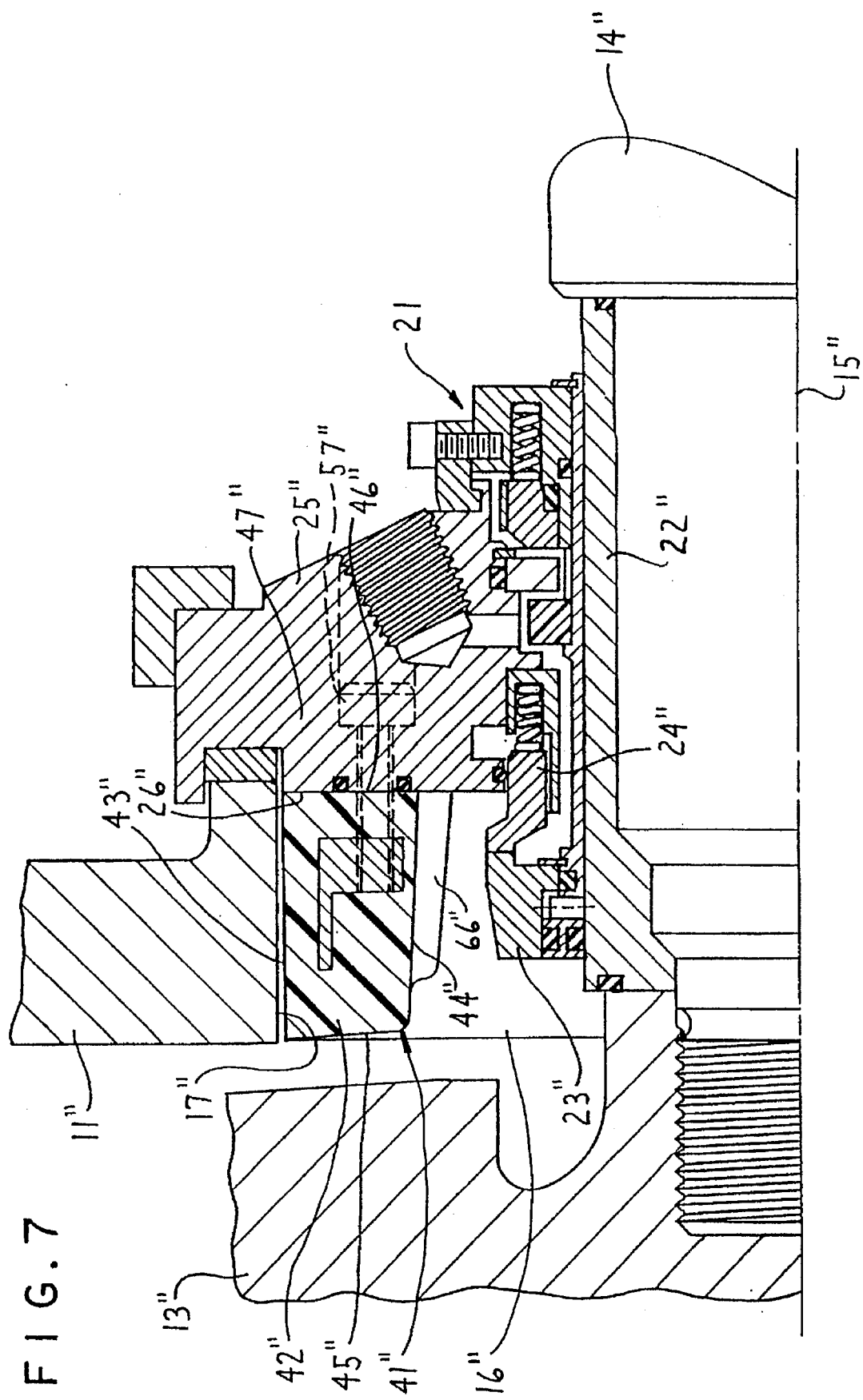
FIG. 7 is a further view similar to FIG. 2 but illustrating a third embodiment of the annular protector according to the present invention.

Referring now to FIG. 7, there is illustrated a third embodiment of an annular protector ring for use in a seal chamber. The protector ring of FIG. 7 possesses many of the same structural and functional relationships possessed by the protector ring of FIG. 2, and corresponding parts thereof are designated by the same reference numerals but with the addition of a double prime (") thereto.

More specifically, the protector ring 41" of FIG. 7 is identical to the protector ring 41 of FIG. 2 except that it does not include a radially inwardly projecting annual flange part at the axially outer end thereof. In situations where the properties of the pump fluid are such as to have less erosion effect, particularly in situations wherein the solid particles in the pump fluid are of smaller size, or in situations where the overall configuration of the mechanical seal or seal chamber may create design restrictions, then it is believed in some environments that the radially inwardly protecting annular flange part can be eliminated and the main body part 42" merely extended axially so as to directly axially abut and be fixed to the inner face of the gland ring 25". In such situation, the axial end face 46" of the protector ring still is effective in covering a significant and typically a majority of the exposed annual face 26" of the gland ring 25", and in particular covers that portion of the face 26" which is adjacent the axially and radially outer corner of the seal chamber, so that the portion of the gland face 26" which is typically subjected to the greatest and most rapid erosion is effectively covered. The ring 41" of FIG. 7 can be constructed in a manner similar to that illustrated by FIG. 6, if desired, in that the ring 41" can be of a suitable molded material having an annular insert therein, such as the insert 71 of FIG. 6, for permitting a fixed but detachable axial securement to the gland 25".

In the embodiment of the protector ring 41" of FIG. 7, the gland 25 is provided with the conventional construction shown by FIG. 1 in that it projects radially inwardly and is provided with an internal O-ring which is maintained in supportive sealing engagement with the periphery of the stationary seal ring 24".

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a pump arrangement having a housing provided with a large-bore seal chamber defined and surrounded by an axially elongated annular boundary wall, a rotatable shaft mounting thereon a pumping element, said shaft projecting substantially axially through said seal chamber, and a mechanical seal assembly cooperating between said shaft and said housing for sealing said seal chamber from the surrounding atmosphere, said mechanical seal assembly including first and second relatively rotatable seal rings disposed in axially adjacent and surrounding relationship to said shaft and having axially opposed annular seal faces maintained in relatively rotatable sealing engagement with one another, said first seal ring being nonrotatably connected to said shaft and said second seal ring being nonrotatably mounted relative to said housing, said mechanical seal assembly also including a gland ring nonrotatably mounting said second seal ring thereon and projecting radially outwardly of said shaft and being fixedly but releasably connected to said housing for substantially closing off an outer axial end of said seal chamber, said gland ring defining thereon an axially-oriented inner end face defining an outer axial end boundary of said seal chamber, the improvement comprising an erosion protector ring means positioned within said seal chamber for substantially covering and protecting said annular boundary wall and said gland inner end face from erosion by pumping fluid contained within the seal chamber, said protector ring means including a first axially elongated annular wall part which is substantially concentrically disposed within said annular boundary wall in closely adjacent and directly radially opposed relation for covering said annular boundary wall, said protector ring means also including a second annular wall part which is fixed to and projects radially inwardly from said first annular wall part and is disposed directly axially adjacent in close and axially opposed overlapping relation to the gland inner end face for covering same, said second annular wall part projecting radially inwardly toward said shaft and terminating at a central opening defined by an inner annular edge wall which is disposed in closely adjacent and surrounding relationship to said second seal ring, and said protector ring means further including a plurality of flow-disrupting axially-elongated projections which are fixed thereto and project radially inwardly from said first annular wall part, said projections being disposed in angularly spaced relation around said protector ring means.

2. An arrangement according to claim 1, wherein said first annular wall part includes substantially concentric and axially-elongated outer and inner annular peripheral walls, the outer peripheral wall being disposed in closely adjacent and directly radially opposed relation to the annular boundary wall, and said projections being joined to and projecting radially inwardly from said inner peripheral wall, said projections at one end thereof being joined to said second annular wall with said projections extending axially inwardly of said seal chamber away from said second annular wall toward an opposite axial end of said ring means.

3. An arrangement according to claim 2, wherein said projections project radially inwardly to a diameter which is substantially greater than the diameter of the central opening.

4. An arrangement according to claim 3, including an annular elastomeric seal ring disposed in concentric relationship with and in sealing engagement between said second seal ring and said second annular wall.

5. An arrangement according to claim 1, including an annular elastomeric seal ring disposed in concentric relationship with and in sealing engagement between said second seal ring and said second annular wall.

6. An arrangement according to claim 5, wherein the inner annular edge wall of said central opening has a radially outwardly projecting annular groove formed therein, and said elastomeric seal ring is axially confined within said groove.

7. An arrangement according to claim 1, wherein said ring has an annular guide groove formed concentrically therein and projecting axially away from said gland inner end face, and said protector ring means has an annular guide flange projecting axially outwardly thereof at one end thereof and being disposed in said guide groove.

8. An arrangement according to claim 7, including first and second concentric and radially spaced elastomeric seal rings which are positioned generally at the engagement between the gland inner end face and the opposed end face of said first annular part for creating a sealed engagement therebetween.

9. An arrangement according to claim 1, including a plurality of fasteners mounted on and projecting axially through said gland ring for fixed but removable engagement with the protector ring means so that the protector ring means is mounted on and carried entirely by said gland ring.

10. An arrangement according to claim 1, wherein said protector ring means comprises a one-piece ring and said first annular wall part has an axial length which effectively covers substantially the entire axial length of the annular boundary wall, wherein said second annular wall part mounts seal means thereon generally around said central opening for direct sealing engagement with an exterior peripheral wall of said second seal ring, and wherein said projections are joined to said second annular wall and project axially inwardly therefrom along an inner peripheral wall of said first wall part so as to be disposed in surrounding but radially outwardly spaced relationship from said first and second seal rings.

11. An arrangement according to claim 10, wherein said gland ring has an annular guide groove formed concentrically therein, said guide groove projecting axially away from the gland inner end face, and said protector ring means having an annular guide flange which projects axially outwardly at the end thereof adjacent said inner end face for projection into said annular guide groove.

12. An arrangement according to claim 1, including a plurality of threaded fasteners mounted on and projecting generally axially through said gland ring for threaded engagement with said protector ring means for axially but removably fixing said ring means in concentric and axially projecting relation to said gland ring.

13. An arrangement according to claim 12, wherein said first annular wall part has a generally enlarged and rectangular cross section when viewed in axial cross section, said rectangular cross section being axially elongated, and said second annular wall apart being fixedly related to said first annular wall part directly adjacent an axially outer end of the latter with said second annular wall part having an axial thickness which is a small fraction of the overall axial length of said first axial wall part, and said second annular wall part projecting radially inwardly a substantial distance beyond an inner annular peripheral wall of said first annular wall part, whereby said first and second annular wall parts define a generally L-shaped configuration when viewed in axial cross section.

14. An arrangement according to claim 1, wherein said protector ring means comprises first and second separate annular ring members respectively defining said first and second annular wall parts, said first annular ring member having an axial length which is significantly greater than the axial length of said second annular ring member, and said second annular ring member being fixedly axially positioned directly between the said first annular ring member and said gland ring.

15. An arrangement according to claim 14, including fasteners mounted on and projecting generally axially through said gland ring and then axially through said second annular ring member and axially into said first annular ring member for fixed but detachable engagement therewith so as to hold said annular protector ring means in concentric and axially projecting relation to said gland ring.

16. The combination comprising a pump housing provided with a enlarged-bore seal chamber defined and surrounded by an axially elongated annular boundary wall, a rotatable shaft projecting axially through said seal chamber, and a mechanical seal assembly cooperating between said shaft and said housing for sealing said seal chamber from the surrounding atmosphere, said mechanical seal assembly including first and second relatively rotatable and opposed seal rings disposed in axially adjacent and surrounding relationship to said shaft and having opposed annular seal faces maintained in relatively rotatable sealing engagement with one another, the mechanical seal assembly also including an annular gland ring disposed in surrounding relationship to the shaft and nonrotatably supporting thereon one of said seal rings, said annular gland ring projecting radially outwardly for fixed but detachable securement to the housing, the gland ring having an inner axially-oriented gland face which at least partially defines one axial boundary of the seal chamber for isolating the chamber from the atmosphere, and erosion protector means positioned within the seal chamber for minimizing erosion of chamber walls by pump fluid contained therein, said erosion protector means including a generally annular wall which is positioned directly axially adjacent and in close and axially opposed overlapping relation to the inner gland face, said erosion protector means also including a plurality of projections which are disposed adjacent a radially outer portion of said seal chamber and project axially and radially inwardly into said seal chamber, said projections being spaced angularly around said seal chamber and being fixedly joined to and projecting from said annular wall, and fastening means mounted on said gland ring and being fixedly but releasably joined to said erosion protector means for fixedly but releasably mounting said erosion protector means directly on said gland ring in coaxial relation therewith.

17. An arrangement according to claim 16, wherein said annular wall projects radially inwardly and terminates at a central opening defined by an inner annular edge which is disposed in closely adjacent and surrounding relationship to the seal ring mounted on said gland ring.

18. An arrangement according to claim 16, wherein said annular wall projects axially inwardly into said seal chamber and has an outer axially-extending annular surface which is positioned directly radially adjacent and in close and radially opposed overlapping relation to an outer annular wall of the seal chamber to minimize erosion thereof, said annular wall having an inner axially-extending annular surface and said projections extending axially along and projecting radially inwardly from said inner axially-extending annular surface.

19. An arrangement according to claim 16, wherein said annular wall has an axial cross section which is axially elongated and defined by generally concentric inner and outer annular surfaces which are both axially elongated, the outer annular surface being disposed in radially opposed and closely adjacent and overlapping relation to an outer annular surface of said seal chamber, said projections being axially elongated along and projecting radially inwardly from said inner annular surface, and said fastening means including a plurality of threaded fasteners which mount on said gland ring and project axially therethrough into co-axially aligned bores formed in said annular wall for fixedly but releasably connecting said annular wall to said gland ring so that said erosion protector means is in its entirety fixedly but releasably carried and mounted on said gland ring and projects co-axially inwardly from the inner end face of the gland ring.

* * * * *

UNITED STATES PATENT AND TRADEMARK OFFICE
CERTIFICATE OF CORRECTION

PATENT NO. : 5 630 699
DATED : May 20, 1997
INVENTOR(S) : Michael Patrick Kirby et al It is certified that error appears in the above-indentified patent and that said Letters Patent is hereby corrected as shown below:

Column 9, line 34; after "said" insert ---gland---.

Signed and Sealed this

Twenty-first Day of October 1997

Attest:

BRUCE LEHMAN

*Attesting Officer*  *Commissioner of Patents and Trademarks*